May 9, 1950
J. M. SCANLON ET AL
2,507,224
SNAP FASTENER
Filed March 20, 1947
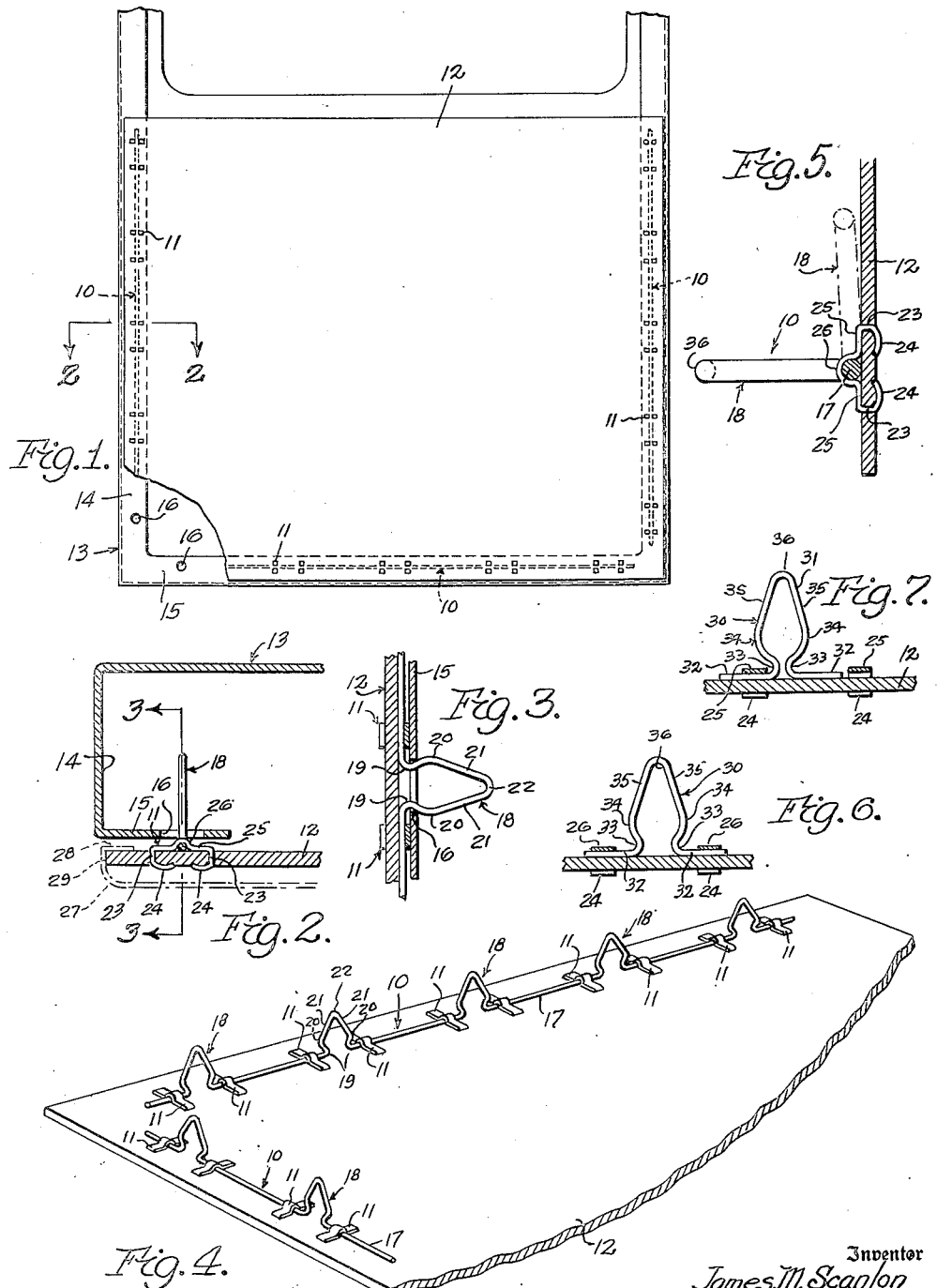
Inventor
James M. Scanlon
Ronald L. Zitrick
Barthel + Bugbee
Attorneys Patented May 9, 1950

2,507,224

UNITED STATES PATENT OFFICE 2,507,224

SNAP FASTENER

James M. Scanlon and Ronald L. Zitrick, Detroit, Mich.

Application March 20, 1947, Serial No. 736,082

1 Claim. (Cl. 45—138)

This invention relates to a fastener and, in particular, to a fastener for securing trimming material panels to vehicle body frame structures.

One object of this invention is to provide a trim fastener which will fasten the trim at a multiplicity of locations, the fastener being connected between such locations.

Another object is to provide a trim fastener which is operable to secure sheet-like materials in over-lapping relationship with the structural members of furniture or vehicle bodies, the fastener being provided with a plurality of fastener portions which are connected to one another so as to strengthen one another.

Another object is to provide a trim fastener for furniture or vehicle bodies consisting of elongated members having projections at intervals therealong, these projections being tongue-shaped so as to be insertable through holes in the furniture or vehicle bodies to which the trim is to be attached.

Another object is to provide a trim fastener for furniture or vehicle bodies consisting of a resilient rod or wire having loop-like bent projections at intervals therealong, the projections having neck portions of reduced width immediately adjacent their connection to said rod or wire.

Another object is to provide a trim fastener as set forth in the preceding objects, wherein the elongated member, rod or wire is hingedly attached to the trim panel so as to lie flat against the panel when desired, so as to facilitate stacking the panels on top of one another until they are ready for use.

Another object is to provide a furniture or vehicle trim fastener as set forth in the preceeding objects, wherein the fastener can be bent into arcuate form such as in rounding a curved portion of the body or a body opening.

Another object is to provide a furniture or vehicle body trim fastener as set forth in the preceding objects wherein the projections or loop-like portions are pushed through similarly spaced holes in the furniture or vehicle body, the projections snapping outward inside the hole so as to secure the trim panel firmly, yet releasably, in position.

Another object is to provide a trim panel for furniture or vehicle body as set forth in the preceding objects wherein the trim panel may be separated from the structure to which it is attached merely by prying the two members apart without requiring special tools.

Another object is to provide a furniture or vehicle body trim fastener as set forth in the preceding objects which, upon shrinkage of the panel to which it is attached, will slide longitudinally to automatically compensate for the shrinkage.

Another object is to provide a trim fastener which may be applied to a panel before the trimming operation and wherein the entire number of fasteners is attached to the panel at one time, all fasteners being movable simultaneously and formed from a single piece of material so that they are automatically aligned with the holes into which they are to be inserted.

In the drawings:

Figure 1 is a front elevation of a portion of a vehicle body, such as a door, with a trim panel attached thereto by the trim fastener of the present invention;

Figure 2 is an enlarged horizontal section taken along the line 2—2 in Figure 1;

Figure 3 is a vertical section taken along the line 3—3 in Figure 2;

Figure 4 is a perspective view of a portion of a trim panel having a pair of trim fasteners of the present invention mounted thereon;

Figure 5 is a sectional view similar to a portion of Figure 2, but showing the manner in which the trim fastener may be folded flat against the trim panel;

Figure 6 is a sectional view of a modified fastener for replacement purposes; and Figure 7 is a view of the modified fastener of Figure 6 showing the manner in which it is inserted into its pivotal mounting.

Referring to the drawings in detail, Figures 1 to 5 inclusive show a trim fastener generally designated 10, according to a preferred form of the invention, as mounted by attachment members 11 upon a trim panel 12. The trim panel 12 is to be secured to the inside of a body structural member 13, such as a vehicle door. The panel 12 is of fibre board or other suitable material, and is used for supporting the upholstery. The door 13 is usually of metal with an edge flange 14 and an inwardly-turned flange 15 having spaced holes 16 at intervals therealong (Figures 1 and 2).

The fastener 10 consists of an elongated rod or wire 17 (Figure 4) having loop-like pointed tongues 18 at intervals therealong corresponding to the intervals between the holes 16 in the flange 15. The tongues 18 are approximately V-shaped, with inwardly bent portions 19 adjacent their junctions with the rod or wire 17. The tongues 18 have outwardly bent portions 20 immediately beyond the inwardly bent portions 19, and have converging portions 21 meeting at a point or tip 22. The inwardly bent portions 19 form a neck portion for the tongues 18, and serve to engage the edges of the metal around the holes 16, as shown in Figure 3.

The trim fasteners 10 are hingedly secured to the panel 12 by means of the attachment members 11, which preferably consist of staples applied by means of a conventional stapling machine. The stapling machine itself forms no part of the present invention, but the staples 11 inserted by the machine have arms 23 which are forced through the panel 12, making their own holes and having their ends 24 automatically bent back upon the panel 12 (Figure 2). The arms 23 are interconnected by a bridge portion 25 having a loop 26 extending over the wire or rod 17 and providing a pivotal connection therebetween. It is preferred that a pair of staples 11 be provided for each tongue 18, and on opposite sides thereof. The sheet or layer 27 of upholstery, indicated by the chain lines in Figure 2, is attached to the panel 12, such as by a suitable adhesive, the end 28 thereof being overlapped around the edge 29 of the panel 12. As shown in Figure 4, a pair of elongated fasteners 10 may be secured to the panel 12 at right angles to one another in order to attach the panel 12 to portions having holes in lines perpendicular to one another.

The fasteners 10 are prefabricated with the tips or points 22 of the tongues 18 located at predetermined intervals. They are then stapled to the panel 12 in the correct positions corresponding to the locations of the holes 16 in the flange 15. While they are being stored, the panels 12 are stacked on top of one another with the fasteners 10 folded flat against the panels 12 as shown in the chain lines in Figure 5.

The modified fastener 30 shown in Figures 6 and 7 is generally similar to the fastener 10, except that it is provided with but a single tongue 31 connected to oppositely extending feet 32. The tongue 31, like the tongues 18, has inwardly bent portions 33 adjacent the junction thereof with the fitting 32, outwardly bent portions 34 and inclined portions 35 converging toward a pointed tip 36. The modified fastener 30 is used as a replacement fastener in the event that one of the tongues 18 upon a multiple fastener 10 becomes damaged or broken. In such an event, the tongue portions 34 are squeezed together as shown in Figure 7, one of the feet 32 is inserted beneath one of the staples 11.

In the use of the invention, assuming that the fasteners 10 have been attached to the edges or other portions of the panel 12 as shown in Figure 4, the panel is attached merely by lining up the tongues 18 with the holes 16 and pushing the latter through the former until all have been fitted therein. When the tongues 18 pass through the holes 16, as shown in Figure 3, the outwardly bent portions 20, which are separated a wider distance than the diameters of the holes 16, spring inward a slight amount in order to enter the holes. The outwardly bent portions 20, after entering the holes 16, spring outward into the positions shown in Figure 3. When this occurs, the inwardly bent portions 19 forming the neck portions of the tongues 18 snap around the edges of the holes 16 and firmly secure the panel 12 to the flange 15 of the body structure 13.

As previously stated, the modified form shown in Figures 6 and 7 is employed as a replacement unit for broken tongues 18, or in positions where it is impracticable or inconvenient to use the multiple-tongued fasteners 10.

To remove the panel 12 from the door or other structural member 13 it is merely necessary to insert a screw driver adjacent holes 16 and pry the tongue 18 out of the holes. When this occurs, the enlarged portions 20 or 34 (Figures 3 or 7) move toward one another to permit the tongue 18 or 30 to move out of the hole, after which they resume their former positions.

Since the fastener of the present invention has multiple tongues projecting at intervals from an elongated rod or wire 17, the spring effect is distributed along the entire length of the latter. Furthermore, the tongues 18 are virtually aligning, since they are automatically lined up by being connected to the straight rod or wire 17; thus the multiple-tongued fastener has great advantages over prior fasteners made up of individual elements, each of which had to be lined up with its particular hole, not only in inserting it in the hole, but also in securing it to the panel. The present fastener, moreover, may be bent around curves such as where the edge of a rear door of a vehicle curves around a rear fender. In that case, the rod or wire 17 is merely bent into the form of an arc corresponding to the edge curvature of the door.

The use of the present fastener eliminates all adjusting or aligning work on the assembly line, as the tongues 18 of the fasteners 10 are already aligned once they are stapled to the panels 12. The staples 11 can be inserted individually or by the use of a gang stapling machine. As previously stated, the fasteners can be folded flat against the panels 12 until they are ready for use, thus facilitating storage of the completed panels.

The present invention permits the required number of fasteners to be attached to the panel before the trimming operation is performed thereon. While the trimming operation is being carried out, the fasteners, being hinged to the panel, lie in flat positions and therefore are out of the way. For the same reason they are out of the way while the panels are piled or stacked. When the panel is ready to be attached to the vehicle or other article such as furniture, all of the fasteners in a series can be raised quickly merely by lifting one of the loops or tongues. This causes the series of loops or tongues to be raised into vertical positions simultaneously so that all of the tongues are aligned automatically with the holes in the vehicle body or other article to which the panel is to be attached. This invention, therefore, eliminates the time-consuming and expensive operations of applying single fasteners one at a time and lining them up with the holes after the panel is trimmed. The invention also eliminates the necessity for special tools and prevents the soiling of the finished panel which frequently occurs when single fasteners are used.

What we claim is:

An attachable panel or strip assembly for a perforated support comprising a panel or strip member, a plurality of attachment staples secured at intervals along said member and having aligned apertures therein, and an elongated resilient wire of circular cross-section hingedly mounted in said staples and passing through said apertures and having thereon a plurality of approximately V-shaped loops for insertion in said perforations, said loops having approximately pointed outer ends and having portions bent toward one another adjacent their junctions with said elongated wire to provide neck portions engageable with the edges of said perforations.

JAMES M. SCANLON.
RONALD L. ZITRICK.

REFERENCES CITED

The following references are of record in the file of this patent:

UNITED STATES PATENTS

| Number | Name | Date |
| --- | --- | --- |
| 1,964,554 | Ball | June 26, 1934 |
| 2,100,812 | Marshall | Nov. 30, 1937 |
| 2,160,636 | Ball | May 30, 1939 |
| 2,287,606 | Eady | June 23, 1942 |